Feb. 23, 1943.  C. Q. PAYNE  2,311,962
APPARATUS FOR LOW TEMPERATURE REDUCTION OF IRON ORES
Filed March 15, 1941  2 Sheets-Sheet 1
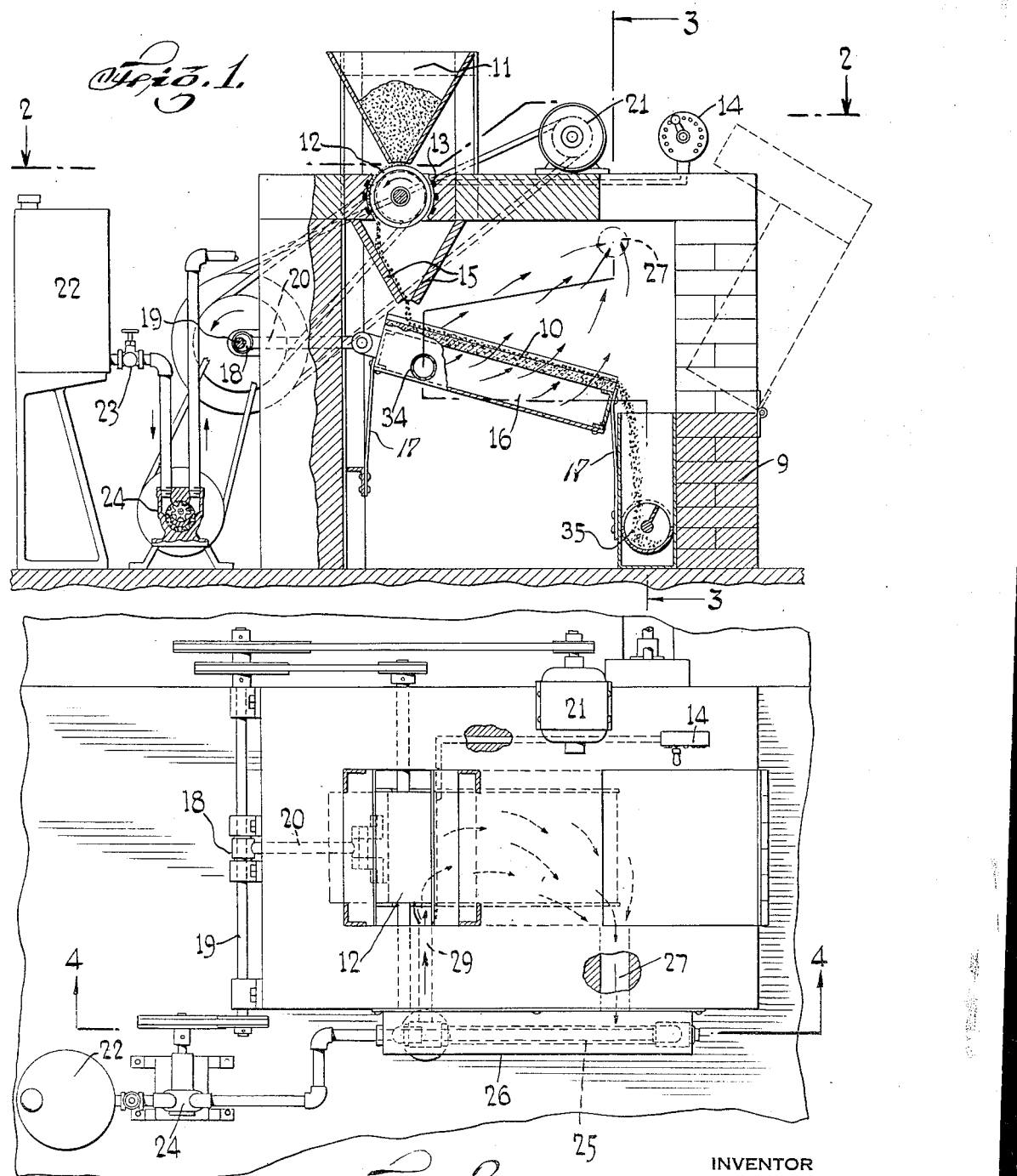
INVENTOR
CLARENCE Q. PAYNE
BY
ATTORNEYS

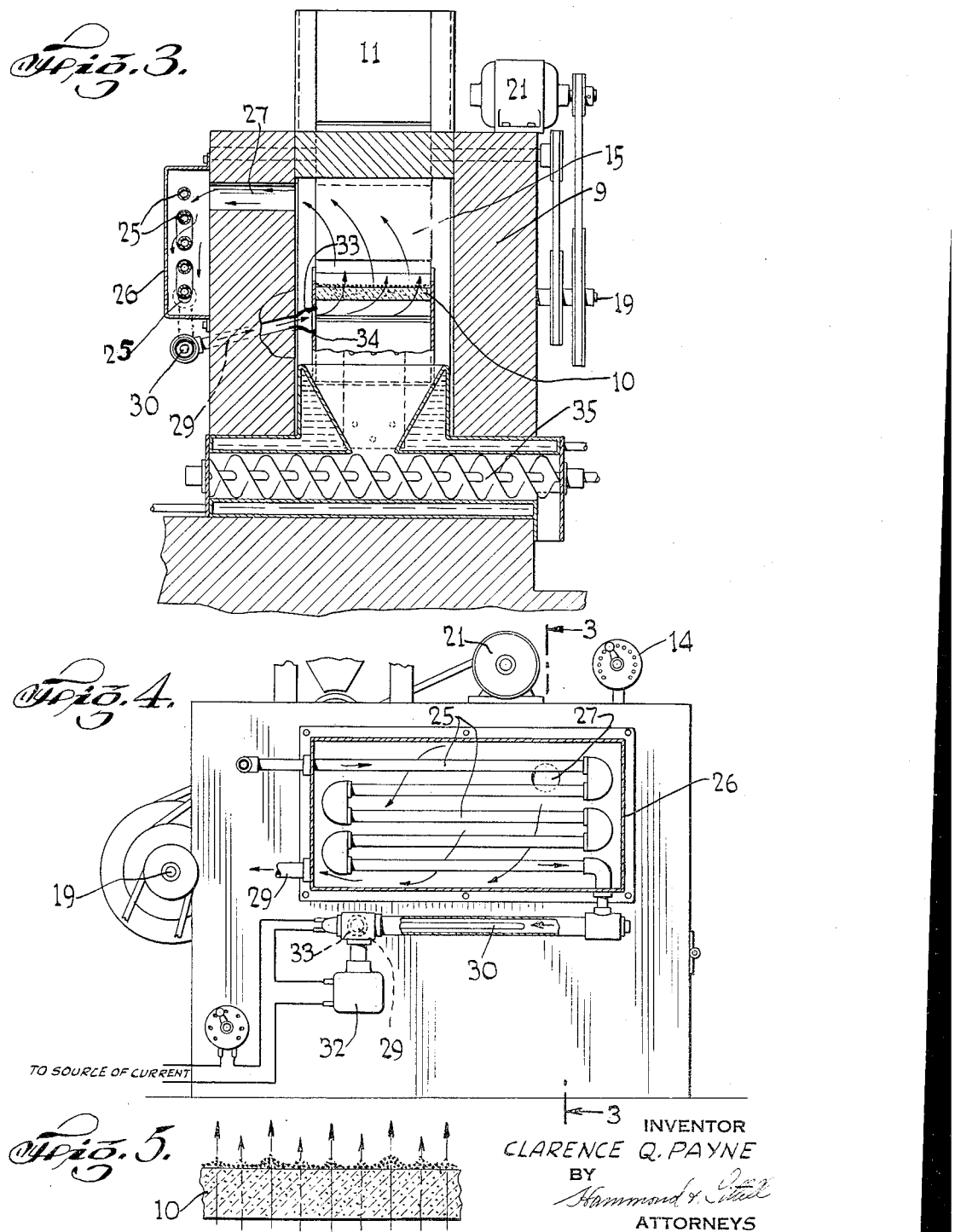

Patented Feb. 23, 1943

2,311,962

UNITED STATES PATENT OFFICE 2,311,962

APPARATUS FOR LOW TEMPERATURE REDUCTION OF IRON ORES

Clarence Q. Payne, New York, N. Y.

Application March 15, 1941, Serial No. 383,532

1 Claim. (Cl. 266—14)

The present invention relates to apparatus for reducing various ores and minerals. It is especially designed for the reduction of iron ores which have been so highly enriched by the removal of their gangue minerals that they can be completely reduced to the metallic state, or to sponge iron, at a low temperature of about 900° C. without further treatment.

When applied to such iron ores this invention has a two-fold object. In the first place, it aims to secure a very pure metal by low temperature reduction thereby avoiding the absorption of impurities from the gangue minerals which occurs at high temperature reduction, as in the case of the blast furnace in the presence of incandescent carbon. In the second place, to enable this pure low temperature product, or sponge iron, to be melted at a high temperature by a new method of electric melting which, while maintaining its purity, can be accomplished at a cost which enlarges its field. In its general purpose, it is similar to my invention described in Letters Patent No. 2,206,973, granted July 9, 1940. It differs, however, from the above invention in important new structural features whereby a closer control of the temperature, and also of the time of the reduction, is obtained. These improvements enable the efficiency of the final reduction to be more closely controlled and safeguarded.

This new process and apparatus may be applied to other metals besides iron, especially to those which are refractory and have a high melting temperature, but which can be molded, sintered and utilized at a low temperature in powder form with market advantage. Such are the metals tungsten, chromium, titanium, etc., and their alloys.

In its application to iron ores, the invention involves preheating the enriched ores concentrates in a finely divided, or powdered, state, preferably under electric heat control. It also involves preheating the reducing gas separately from the ore by recuperating waste heat under electric heat control. Above all, it involves the reduction of the ore particles upon a porous refractory mineral support or septum, which is maintained in rapid motion, and through which the reducing gas is made to pass under pressure whereby the ore particles are treated, and preferably kept in active vertical agitation without sintering.

The nature and objects of the invention will be better understood from a description of the accompanying drawings in which Figure 1 shows, in vertical section, a simple embodiment of the invention comprising a furnace and its accessories. Here the furnace enclosure is shown at 9, and at 10 is a vibrating refractory support contained within it, on which the ore is fed and reduced. Fig. 2 shows in plan view, with parts in section on the line 2—2 of Fig. 1, the hopper 11 and the preheated feed-roller 12, which feeds the ore onto the inclined porous refractory support, or table 10, where it is reduced by preheated reducing gas which passes through the table. Fig. 3 is a vertical sectional view taken on the line 3—3 of Fig. 1. The flow of the reducing gas, through the furnace and through the refractory support, is indicated by broken lines and arrows. Fig. 4 shows, in side view, a simple form of recuperator to utilize the waste heat of the spent gas in order to heat the fresh reducing gas. Fig. 5 shows an enlarged section of the porous table to illustrate the vertical agitation of the ore particles by the pressure of the preheated gas passing through its pores.

In the operation of this process of ore reduction, the ore, or preferably its enriched concentrate, is fed from the hopper 11 in a thin stream into the furnace. These concentrates, when obtained from low grade ores, are usually crushed quite fine in order to unlock and then to separate them from their gangue minerals. This may require that they be crushed to pass a 20 mesh screen or even finer. An apparatus for magnetic separation is shown in the patent to Payne, No. 2,186,516, dated January 30, 1940.

The feed-roller 12, below the hopper, is preferably made of a refractory material like carborundum, and is preheated by radiation from electrically heated resistance alloy strips, such as Nichrome 13, 13. These are placed in close proximity to the feed roller on both sides of it, and their temperature is regulated by means of a rheostat 14 so that the feed stream passing over the roller is raised to a temperature of about 900° C. The feed stream is then guided by the inclined refractory plates 15, 15 and falls upon the upper end of the inclined porous vibrating table 10. This table is composed of porous refractory plates, such as silicon carbide (SiC) or alundum ($Al_2O_3$), etc., and they form the top of an air tight enclosure 16. Both carborundum and alundum are refractory electric furnace products. These are formed at melting temperatures of about 2000° C. When crushed and screen-sized, the grains are then fused into porous plates at a temperature much higher than that to which they are exposed during the process of ore reduction.

The sides and bottom of the enclosure 16 may be made of stainless steel, or suitable heat resistant material, and are lined on the inside with refractory cement in order to prevent contact of the reducing gas with its metal surfaces. The table, with its enclosure, is mounted upon the steel springs 17, 17 at its four corners. These permit a slight forward and backward vibrating motion of the table of about one eighth or one quarter of an inch, when driven by the eccentric 18 on the countershaft 20 and connecting rod 19. Countershaft 20 is driven from the motor 21.

The exact nature of the reducing gas will depend upon the character of the iron ore deposit to be concentrated and reduced as well as upon economic considerations. While hydrogen is technically the most desirable gas for reducing iron oxides, natural gas is the least expensive where it is available. Other gases such as propane and butane, etc., which are the lighter hydrocarbons resulting from the fractional distillation of crude oil, can also be made available. Water gas and producer gas, when subjected to a preliminary cracking operation, may likewise be used. For the purpose of illustrating my process, I have shown at 22 a storage supply of a light hydrocarbon oil, such for example as one containing principally $C_2H_6$, which is generally available. The oil is led through a regulating valve 23 to a pressure pump, indicated conveniently at 24, and from there to a heat exchange unit or heat recuperator shown in Fig. 4, in which the oil is gasified and the gas heated by means of the waste heat derived from the spent reducing gas. This recuperator includes a series of pipes 25, which pipes are coated and lined with refractory cement to protect them from contact with the hot reducing gases. This piping system is contained within an enclosure 26. The hot gases from the ore reducing chamber are forced from the outlet 27 through the casing 26, in contact with the pipes 25, and through the conduit 29. The preheated reducing gas is further heated by an electrical heating unit 30, which under control of the rheostat 31 and the thermostat 32, raises the temperature of the gases to about 900° C. The gases are thus heated independently of the ore to be reduced. They are then passed into the furnace enclosure 16, as shown through the refractory flexible connection 33, Fig. 3 and the opening 34, Fig. 2 to the underside of the porous table 10.

The porosity of the refractory table measured by the number of cubic feet of gas which can be passed through it per square foot depends upon the gas pressure, upon the grain sizes composing the plates, and also upon the thickness of the plates. In general, when the gas is given a pressure of 5 to 10 lbs. per sq. in. and the porosity of the plates allows the passage of 20 to 40 cu. ft. of gas per square foot per minute, the reduction of the ore proceeds rapidly and completely while the ore stream travels the length of the table.

As already explained above, the ore particles and the reducing gas are separately preheated to about the same temperature of 900° C. under electrical control, and when they are brought together upon the surface of the table, the reduction of the ore particles to metal takes place quite rapidly. The time required for a particle to travel the length of the table depends upon the length and angle of inclination of the table and upon the number of vibrations of the table per minute. With particles of say 20 to 30 mesh size, the time of travel required for reduction will be about one-half to one minute. During this interval, the ore particles in the feed stream are spread over the width and the length of the table and are substantially continuously acted on by the reducing gas issuing from the innumerable pore openings in the table. The adjustments which control the time of reduction can be changed to suit different ores. Usually a table about 4 ft. long, and inclined at an angle of 15° to the horizontal, should be vibrated at a rate of about 200 vibrations per minute to maintain the desired rate of movement of the ore over the table. The object, in all cases, is to make the reduction to metal complete in the shortest possible time, in other words, to treat a large tonnage of ore with the least investment cost for apparatus per ton of ore.

When the reduced ore particles have reached the lower edge of the table, they then fall against water cooled surfaces in order to prevent their reoxidation. They may then be discharged from the furnace by means of a screw conveyor, as shown at 35, Figs. 1 and 3. This completes the brief cycle of their reduction.

Heretofore, low temperature reduction of iron ores, in the production of sponge iron, has encountered certain difficulties which have hampered its development. The principal difficulties have been to secure low temperature control and to prevent sintering of the ore while undergoing reduction. I have endeavored to overcome these difficulties which are closely related by my present invention. In the past, the attempt has been repeatedly made to reduce iron ore to sponge iron by charging it with coal or coke into an oven 20 to 30 ft. high, and allowing the charge to descend in the oven (heated on the outside) at a proper rate of speed. This is known as the by-product coke oven type of reducing furnace. It has been unsatisfactory, owing mainly to sintering of the charge in the furnace due to lack of temperature control. The sintering of ore particles causes them to weld together under the pressure of the charge, and then builds up a huge "salamander," which stops any further reducing action.

By means of close temperature control, both of the ore particles and of the reducing gas, overheating can be prevented during the ore reduction. Furthermore, by supporting the ore particles on the refractory table by means of gas pressure from below, their effective weight is greatly reduced and no welding is possible since they are kept in vertical agitation while they move along the table.

This type of reducing furnace may also be employed to increase the magnetic attractability of various ferromagnesian minerals like hornblende, etc., which are frequently associated with ceramic materials like feldspar, syenite, glass sand, etc. A reducing roast increases the attractability of these feebly magnetic minerals, and their complete magnetic separation then becomes possible. This greatly increases the commercial value of such ceramic materials.

The foregoing particular description of the process and apparatus for use in practicing that process is illustrative merely, and is not intended as defining the limits of the invention. Obviously, modifications and variations may be made in the process and in the apparatus without departing from the scope of the appended claim.

I claim:

Apparatus for reducing iron ore concentrates to pure sponge which comprises means for preheating said concentrates, comprising a feed-gap provided with radiant heating means; means for feeding said preheated concentrates in a thin sheet upon an inclined porous mineral hearth and means for vibrating said hearth; in combination with means for separately preheating a reducing gas comprising an electrical heater to control the final temperature of the gas, and means for passing said gas through said mineral hearth.

CLARENCE Q. PAYNE.